US007776956B2

(12) United States Patent
Webster et al.

(10) Patent No.: US 7,776,956 B2
(45) Date of Patent: Aug. 17, 2010

(54) WATER DISPERSIBLE EPOXY URETHANE COMPOUNDS AND COATING COMPOSITIONS

(75) Inventors: Dean C. Webster, Fargo, ND (US); Peter A. Edwards, Cokato, MN (US)

(73) Assignee: NDSU Research Foundation, Fargo, ND (US)

( * ) Notice: Subject to any disclaimer, the term of this patent is extended or adjusted under 35 U.S.C. 154(b) by 96 days.

(21) Appl. No.: 11/882,754

(22) Filed: Aug. 3, 2007

(65) Prior Publication Data

US 2008/0071022 A1 Mar. 20, 2008

Related U.S. Application Data

(60) Provisional application No. 60/835,433, filed on Aug. 4, 2006.

(51) Int. Cl.
*C08G 18/09* (2006.01)
(52) U.S. Cl. .................................... 524/591
(58) Field of Classification Search ................ 524/591
See application file for complete search history.

(56) References Cited

U.S. PATENT DOCUMENTS

| 4,397,993 | A | | 8/1983 | Tefertiller et al. |
| 5,043,381 | A | | 8/1991 | Coogan et al. |
| 6,100,326 | A | * | 8/2000 | Richter et al. ............... 524/591 |
| 6,172,159 | B1 | | 1/2001 | Gaal, Jr. et al. |

FOREIGN PATENT DOCUMENTS

WO          WO 02-31021 A1      4/2002

OTHER PUBLICATIONS

Bayhydur XP 7165 data sheet, Sep. 2002.*
Hsia Hung-Chung et al., "Glycidyl-Terminated Polyurethane Modified Epoxy Resins: Mechanical Properties, adhesion Properties and Morphology", Journal of. Applied. Polymer. Science., vol. 52, (1994), 1137-1151.
Peter A. Edwards et al., "Novel Polyurethane Coating Technology Through Glycidyl Carbamate Chemistry", JCT Research, vol. 2(7), (2005), 517-527.
Peter A. Edwards et al., "Synthesis and Self-Crosslinking of Glycidyl Carbamate Functional Oligomers", Polymer Preprints.,vol. 44(1), (2003), 54.
Dieter Dieterich, "Die Angewandte Makromolekulare Chemie" (1981), 133-165.
Byung Kyu Kim et al., "Waterborne Polyurethanes and Their Properties", Journal of Polymer Science: Part A: Polymer Chemistry, vol. 34, (1996), 1095-1104.
Michael Dvorchak et al., "A New Water Reducible Blocked Polyisocyanate (NWRBP) for One Component (1K) Polyurethane Coatings", Proceedings of the International Waterborne, High-Solids, and Powder Coatings Symposium, (2000), 405-419.
John A. Escarsega et al., "Water-Reducible PUR Coatings for Military Applications", Modern Paint and Coatings, (1997), 21-30.
Melissa A. Grunlan et al., "Waterborne Coatings with an Emphasis on Synthetic Aspects; An Overview", American Chemical Society Symposium Series, (1997), 1-26.
Roy E. Hartz, "Reaction During Cure of a Blocked Isocyanate-Epoxy Resin Adhesive", Journal of Applied Polymer Science, vol. 19, (1975), 735-746.
Anthony Page et al., "Polyester Resins in Water-Based Urethanes", Paint & Ink International, vol. 9(2), (1996), 37-40.
Michael J. Dvorchak et al., "Water-Reducible Unsaturated Polyester Polymers as Binder for UV-Curable Furniture Coatings", Proceedings of the Waterborne, High-Solids, and Powder Coatings Symposium, (1989), 253-267.
Zhiming Wang et al., "Synthesis and Characterization of UV-Curable Waterborne Polyurethane-Acrylate Ionomers for Coatings", Journal of Applied Polymer Science, vol. 73, (1999), 2869-2876.
Jian-wen Yang et al., "Chain-extended UV-Curable Waterborne Polyurethane-Acrylate", Gaofenzi Cailiao Kexue Yu Gongcheng, vol. 19(2), (2003), 199-202 (with English Abstract).
Jong Yoon Jang et al., "Effect of Process Variables on Molecular Weight and mechanical Properties of War-Based Polyurethane Dispersion", Colloids and Surfaces, A: Physicochemical and Engineering Aspects, vol. 196, (2002), 135-143.
G. Guenduez et al., "Structure-Property Study of Waterborne Polyurethane Coatings with Different Hydrophilic Contents and Polyols", Journal of Dispersion Science and Technology, (2004),vol. 25(2), 217-228.
Qu Jinqing et al., "Synthesis of High Solid Content Waterborne Polyurethane Dispersion", Huagong Xucbao (2003), vol. 54(6), 868-871, (with English Abstract).
Xiao-hui Song et al, "Effect of PEG Molecular Weight in Hydrophilic Segment on the Crystallization of Cast Film of Waterborne Polyurethane", Xiamen Daxue Xuebao, Ziran Kexueban, vol. 41(4), (2002), 463-467.
D.D. Web, "Urethane Systems Reactivity Measurement", Journal of Cellular Plastics, (1985), 208-212.
H.-W. Illger et al., "Reaction Kinetics Study of High Resilient Polyurethane Foams", Polyurethanes World Congress, (1987), 305-310.

* cited by examiner

*Primary Examiner*—Mark Eashoo
*Assistant Examiner*—Noah Frank
(74) *Attorney, Agent, or Firm*—J.A. Lindeman & Co., PLLC

(57) ABSTRACT

The invention relates to novel aqueous coating compositions containing epoxy urethane (glycidyl carbamate) functional resin. An aqueous coating composition comprises a polyfunctional oligomer having at least two epoxy urethane functional groups and a polyalkylene oxide chain, a surfactant and water. The aqueous coating compositions of the invention can be dispersed in water with added surfactants to form a dispersion containing no volatile organic solvent. The invention provides a method for making aqueous coating compositions containing epoxy urethane functional resin as well. Water-dispersible epoxy urethane compounds of the aqueous coating compositions are also provided.

20 Claims, 1 Drawing Sheet

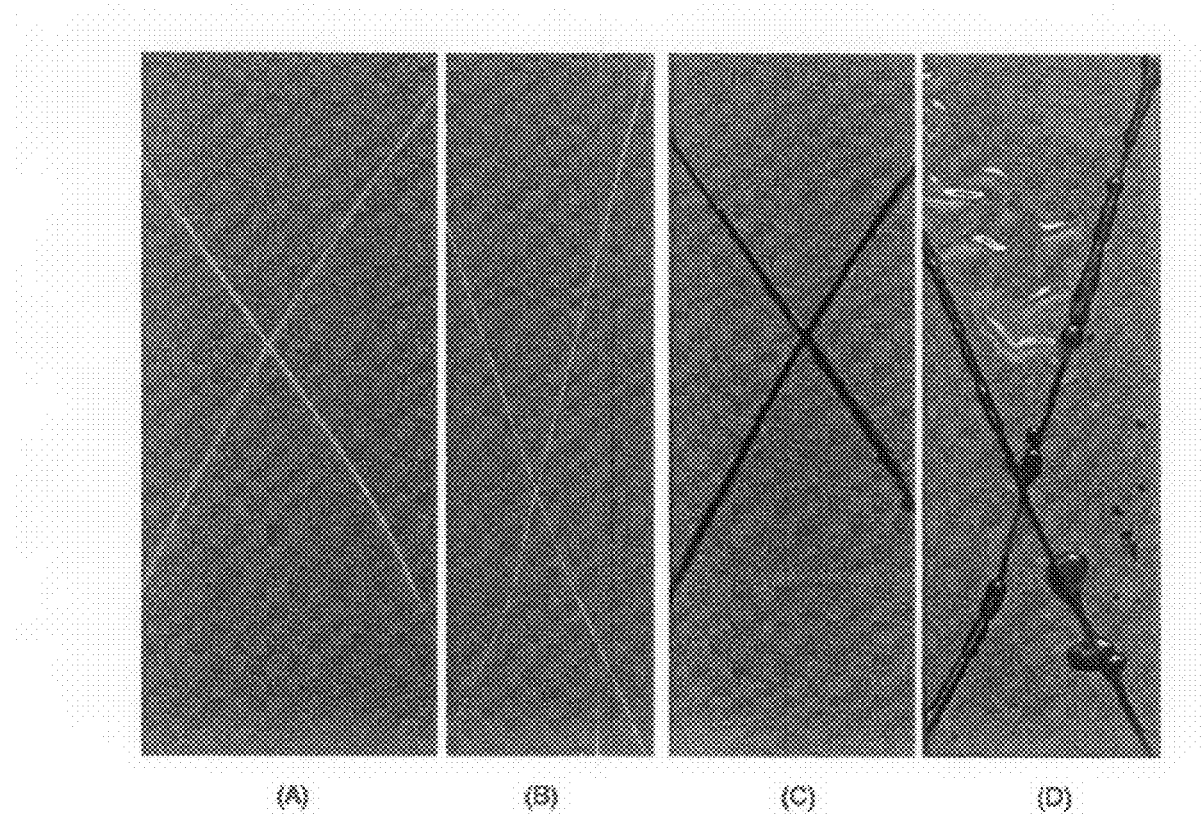
Figure 1: Salt spray testing (ASTM B117) results after 450 hours for: (A) D.E.R. 332:PACM before testing, (C) D.E.R. 332:PACM after exposure, (B) the epoxy urethane resin:PACM before testing and the epoxy urethane resin:PACM after exposure.

WATER DISPERSIBLE EPOXY URETHANE COMPOUNDS AND COATING COMPOSITIONS

CROSS REFERENCE TO RELATED APPLICATIONS

This application claims priority under 35 U.S.C. §119(e) to U.S. Provisional Application Ser. No. 60/835,433, filed 4 Aug. 2006, which is also incorporated herein by reference.

GOVERNMENT RIGHTS

This invention was funded at least in part by funds from the U.S. Government, (Grant Nos. NVY-1S-2025/617 NDSU and NVY-1S-2026/620 NDSU). The U.S. Government may, therefore, have certain rights in this invention.

FIELD OF THE INVENTION

The invention relates to novel aqueous coating compositions comprising a polyfunctional oligomer having at least two epoxy urethane functional groups and a hydroxylated polyalkylene oxide chain, a surfactant and water. The compositions can be dispersed in water with added surfactants to form a dispersion containing no volatile organic solvents. The dispersed polymer can self-crosslink and can also crosslink with multifunctional amine compounds into a hard, glossy, solvent resistant coating.

BACKGROUND OF THE INVENTION

Thermosetting polymers systems are widely used in many applications including protective coatings, composite materials, and adhesives. Many of these systems involve the reaction of polymers or oligomers with other materials containing mutual reactive groups. For example, hydroxyl functional polymers are crosslinked with functional oligomers, or epoxy resins are crosslinked with polyfunctional amines.

The final properties of thermoset coatings are determined by the composition of the reactants used. Epoxy coatings generally exhibit good corrosion performance while polyurethane systems result in coatings having good toughness, abrasion resistance, and durability. Epoxy urethane (glycidyl carbamate) chemistry has the potential of combining epoxy and polyurethane technology into a single system and has been shown to improve toughness in epoxy-amine systems (Hsia H. C. et al., "*Glycidyl-Terminated Polyurethane Modified Epoxy Resins: Mechanical Properties, adhesion Properties and Morphology*", *J. Appl. Polym. Sci.*, 52, 1134 (1994) and Edwards, P. A. et al., "*Novel Polyurethane coating Technology Through Glycidyl Carbamate Chemistry*", JCT Research, 2, 517, (2005)).

Epoxy urethane (glycidyl carbamate) group is readily synthesized from the reaction of an isocyanate with glycidol:

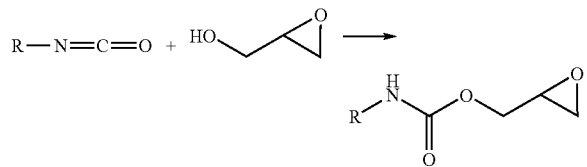

(Tefertiller, N. B. et al., U.S. Pat. No. 4,397,993; Edwards, P. E. et al., *Synthesis and Self-Crosslinking of Glycidyl Carbamate Functional Oligomers, Polymer Preprints* 2003, 44 (1), 54.)

Epoxy urethane (glycidyl carbamate) functional polymers offer some unique opportunities in the formation of thermosetting polymers because the reactivity of an epoxy resin is combined with the physical properties obtained with polyurethanes. Epoxy urethane (glycidyl carbamate) functional oligomers can thermally self-crosslink and also crosslink with multifunctional amines. Kinetic experiments have shown that the glycidyl carbamate epoxy is more reactive than conventional glycidyl ether epoxides. Physical properties of the coatings are also excellent and have an excellent combination of both hardness and flexibility.

There is an increased interest in developing water-dispersible coating compositions to meet the environmental standards. The preparation of conventional polyurethane dispersions are well known in the art (Dietrich, D., *Die Ang. Makromol. Chem.*, 1981, 98, 133-165; Kim., B. K. et al., *J. Polym. Sci. Polym. Chem. Ed.*, 1996, Vol. 34, 1095-1104; Coogan, R. G. et al., U.S. Pat. No. 5,043,381). Waterborne polyurethane dispersions (PUD) require many process steps but yield good properties and are one of popular methods in reducing volatile organic compounds (VOCs). There are many resins used in water dispersion chemistry. For example, there are alkyd polyurethane dispersions (Dou, Z., et al., "*Low VOC Polyol Alkyd Dispersion and Polyurethane Dispersions*," PCT Int. Appl. WO/2002/031021), hydroxyl functional latexes (Dvorchak, M., et al., "*A new water reducible blocked polyisocyanate (NWRBP) for one component* (1K) *polyurethane coatings*," Proceedings of the International Waterborne, High-Solids, and Powder Coatings Symposium (2000), $27^{th}$ 405-419; Escarsega, J. A., et al., "*Water reducible PUR coatings for military applications*," Modern Paint and Coatings (1997), 87 (7), 21, 24-26; Grunlan, M. A., et al. "*Waterborne coatings with an emphasis on synthetic aspects; an overview.*" ACS Symposium Series (1997), 663 (Technology for Waterborne Coatings), 1-26; Hartz, R. E., "*Reaction during cure of a blocked isocyanate-epoxy resin adhesive*," Journal of Applied Polymer Science (1975), 19 (3), 735, water reducible polyesters (7 Gaal, R. J., et al., "*Water-reducible polyester resins and urethane coatings produced therefrom*," U.S. (2001); Page, A., et al., "*Polyester resins in water-based urethanes*," Paint Ink International (1996), 9 (2), 37, 40; Dvorchak, M. J., et al. "*Water-reducible unsaturated polyester polymers as binder for UV-curable furniture coatings*," Proceedings of the Waterborne, High-Solids, and Powder Coatings Symposium (1991), $18^{th}$ 253-67), and water reducible acrylics (Venditti Wang, et al. "*Synthesis and characterization of UV-Curable waterborne polyurethane-acrylate ionomers for coatings*," Journal of Applied Polymer Science (1999), 73 (844), 2869-2876); and Yang, Jian-wen et al., "*Chain-extended UV-curable waterborne polyurethane-acrylate*," Gaofenzi Cailiao Kexue Yu Gongcheng (2003), 19 (2), 199-202.

One of the major problems with isocyanates when mixing in polyol is that most hydroxyl functional crosslinkers are hydrophobic. In some formulations, this has been overcome by mixing resin particles (Jang, Jong Yoon et al., "*Effect of process variables on molecular weight and mechanical properties of water-based polyurethane dispersion*," Colloids and Surfaces, A: Physicochemical and Engineering Aspects (2002), 196 (2-3), 135-143; Guenduez, G. et al., "*Structure-Property Study of Waterborne Polyurethane Coatings with Different Hydrophilic Contents and Polyols*," Journal of Dispersion Science and Technology (2004), 25 (2), 217-228) to protect the reaction from hydrolysis (Qu, Jinqing et al., "*Syntheses of high solid content waterborne polyurethane dispersion,*" Huagong Xucbao (2003), 54 (6), 868-871) or by isocyanate monomer selection (Song, Xiao-hui et al., "*Effect of PEG molecular weight in hydrophilic segment on the crystallization of cast film of waterborne polyurethane,*" Xiamen Daxue Xuebao, Ziran Kexueban (2002), 41 (4), 463-467). Two component systems are usually formulated with the isocyanate in excess to alcohol, by using a ratio of isocyanates to alcohol of 2:1 (over-indexing). These systems require more isocyanate to be used due to competing reactions with water. One way to lessen isocyanate reactivity with water is to increase molecular weight by building the prepolymer (Jang, Jong Yoon et al., "*Effect of process variables on molecular weight and mechanical properties of water-based polyurethane dispersion,*" Colloids and Surfaces, A: Physicochemical and Engineering Aspects," (2002), 196 (2-3), 135-143; Webb, D. D. "*Urethane systems reactivity measurement,*" Journal of Cellular Plastics (1985), 21 (3), 208-12). The dominant isocyanate reaction is with an alcohol group (Illger, H. W., et al. "*Reaction kinetics study of high resilient polyurethane foams,*" Polyurethanes World Congr. Proc. FSK/SPI (1987), 305-10. Publisher: Technomic, Lancaster, Pa.).

There is currently a great need for low or near zero VOC (volatile organic content) systems in developing waterborne resin technology. Therefore, it is advantageous to provide waterborne polyurethane dispersions that provide the performance currently required by the industries with excellent combination of higher reactivity and physical properties of epoxy and polyurethane technology. It would be also desirable that the coating compositions can be dispersed in water with added surfactants to form a dispersion containing no volatile organic solvent.

SUMMARY OF THE INVENTION

The invention relates to aqueous coating compositions comprising a polyfunctional oligomer having at least two epoxy urethane functional groups and a polyalkylene oxide chain, a surfactant and water. The invention also provides methods for making an aqueous coating composition comprising a polyfunctional oligomer having at least two epoxy urethane functional groups and a polyalkylene oxide chain, a surfactant and water. The aqueous coating composition of the invention is completely solvent-free, i.e., does not utilize any co-solvents, such that the content of VOCs is zero while maintaining the dispersibility of the copolymer in water without any co-solvents.

A water-dispersible epoxy urethane resin of the Formula (I) or Formula (II) of the aqueous coating composition represents another embodiment of the invention.

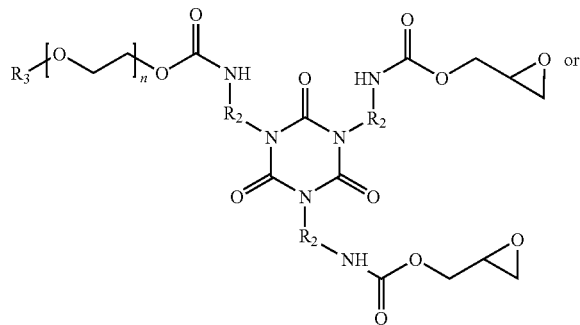

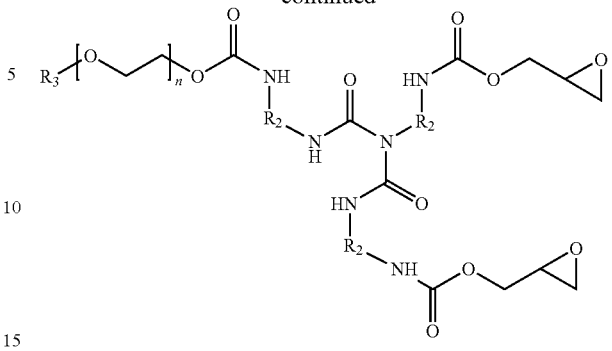

wherein
$R_2$ is independently an optionally substituted, divalent $C_1$-$C_{15}$ alkyl, optionally substituted divalent $C_3$-$C_{15}$ cycloalkyl, or a group selected from

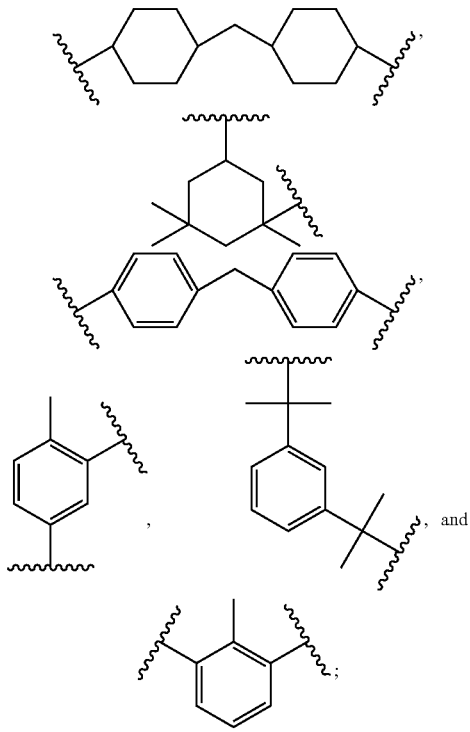

and $R_3$ is independently an optionally substituted $C_1$-$C_{15}$ alkyl or an optionally substituted divalent $C_3$-$C_{10}$ cycloalkyl.

BRIEF DESCRIPTION OF THE FIGURES

FIG. 1 depicts salt spray test panels formulated using an aqueous coating composition of the invention containing and epoxy urethane resin at ambient conditions and D.E.R. 332 reacted with PACM at 80° C. for one hour as a control.

DETAILED DESCRIPTION OF THE INVENTION

The invention is directed to novel aqueous coating compositions comprising a polyfunctional oligomer having at least two epoxy urethane functional groups and a polyalkylene oxide chain, a surfactant and water.

The polyfunctional oligomer is prepared from the reaction of hydrophilic modified polyfunctional resin having the difunctional isocyanates with glycidol. The polyfunctional resin is derived from controlled polymerization or oligomerization of the difunctional isocyanates. Free isocyanate is reacted with glycidol to form an epoxy urethane functional resin. The polyfunctional resin also includes a polyfunctional biuret.

Any suitable organic polyisocyanate, such as an aliphatic, cycloaliphatic, araliphatic or aromatic polyisocyanate, may be used either singly or in mixtures of two or more. The aliphatic isocyanates provide generally better light stability than the aromatic compounds. Aromatic polyisocyanates, on the other hand, are generally more economical and reactive toward polyols and other poly(active hydrogen) compounds than aliphatic polyisocyanates. Suitable aromatic polyisocyanates include but are not limited to those selected from the group consisting of 2,4-toluene diisocyanate, 2,6-toluene diisocyanate, a dimer of toluene diisocyanate (available under the Desmodur™ trademark from Bayer Materials Science, Leverkusen, Germany), diphenylmethane 4,4'-diisocyanate (MDI), 1,5-diisocyanato-naphthalene, 1,4-phenylene diisocyanate, 1,3-phenylene diisocyanate, fluorinated and/or silicone containing derivatives of the aforementioned, and mixtures thereof. Examples of useful cycloaliphatic polyisocyanates include but are not limited to those selected from the group consisting of dicyclohexylmethane diisocyanate ($H_{12}$ MDI, commercially available under the Desmodur™ trademark from Bayer Materials Science, Leverkusen, Germany), isophorone diisocyanate (IPDI), 1,4-cyclohexane diisocyanate (CHDI), 1,4-cyclohexanebis(methylene isocyanate) (BDI), 1,3-bis(isocyanatomethyl)cyclohexane ($H_6$ XDI), and mixtures thereof. Examples of useful aliphatic polyisocyanates include but are not limited to those selected from the group consisting of hexamethylene 1,6-diisocyanate (HDI), 1,12-dodecane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimer diisocyanate, the urea of hexamethyl diisocyanate, and mixtures thereof. Examples of useful araliphatic polyisocyanates include but are not limited to those selected from the group consisting of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, or mixtures thereof.

Preferably, the polyfunctional resin derived from isocyanate or biuret is selected from the group consisting of TDI (toluene diisocyanate), TDI biuret, MDI (diphenylmethane diisocyanate), MDI biuret, HDI (hexamethylene diisocyanate), HDI biuret, NDI (naphthalene diisocyanate), NDI biuret, HMDI (hydrogenated MDI), HMDI biuret, and IPDI (isophorone diisocyanate) and IPDI biuret. More preferably, a polyfunctional resin derived from isocyanate or biuret consists of HDI (hexamethylene diisocyanate) or HDI biuret.

The polyfunctional oligomer of the invention is hydrophilic. Applicable hydrophilic functionality with suitable functional groups can readily be provided with the skilled person. Preferably, the polyfunctional oligomer has a polyalkylene oxide chain with 1 to 50 alkylene oxide units, preferably 2 to 20 alkylene oxide units. More preferably, the polyalkylene oxide chain may be an ethylene oxide chain, a propylene oxide chain, or an ethylene propylene oxide chain.

A preferred polyfunctional isocyanate resin based on hexamethylene diisocyanate and having ethylene oxide units is commercially available and sold under the Bayhydur XP 7165 tradename by Bayer Materials Science, Leverkusen, Germany.

The invention also provides a water-dispersible epoxy urethane resin of the Formula (I) or Formula (II) of the aqueous coating composition:

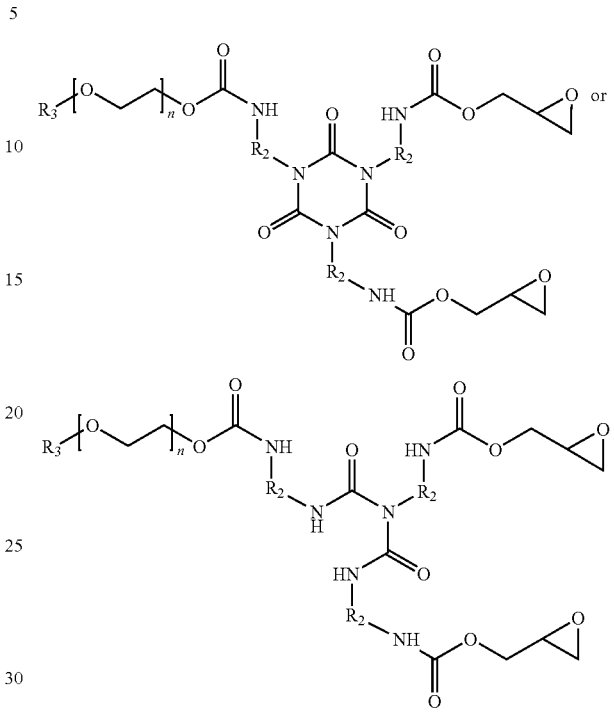

wherein n ranges from 1 to 50

$R_2$ is independently an optionally substituted, divalent $C_1$-$C_{15}$ alkyl, optionally substituted divalent $C_3$-$C_{15}$ cycloalkyl, or a group selected from

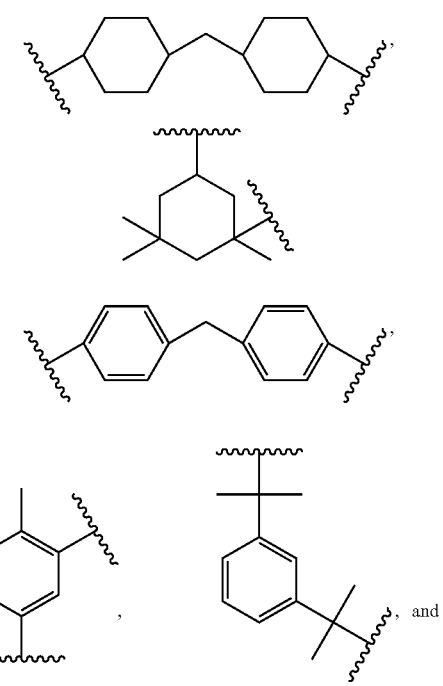

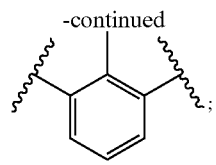

and $R_3$ is independently an optionally substituted $C_1$-$C_{15}$ alkyl or an optionally substituted divalent $C_3$-$C_{10}$ cycloalkyl. Preferably, $R_2$ is —$(CH_2)_6$—, and $R_3$ is a $C_1$-$C_{10}$ alkyl.

The term "alkyl" includes straight and branched alkyl groups. The term "cycloalkyl", as used herein, refers to groups having three to ten, preferably three to seven carbon atoms. Suitable cycloalkyls include, but are not limited to cyclopropyl, cyclobutyl, cyclopentyl, cyclohexyl, cycloheptyl and the like. As indicated above, $R_2$ and $R_3$ may be substituted with any number of substituents or functional moieties. Examples of substituents include, but are not limited to, halo substituents, e.g. F; Cl; Br; or I; a hydroxyl group; a $C_1$-$C_6$ alkoxy group, e.g., —$OCH_3$, —$OCH_2CH_3$, or —$OCH(CH_3)_2$; a $C_1$-$C_6$ haloalkyl group, e.g., —$CF_3$; —$CH_2CF_3$; or —$CHCl_2$; $C_1$-$C_6$ alkylthio; amino; mono and dialkyl amino groups; —$NO_2$; —$CN$; a sulfate group, and the like.

Surfactants are commonly used in coating formulations to improve wetting of the substrate by the coating, and wetting of the pigment by the resin. They can also improve formulating latitude by preventing shocking of the coating composition as various components are added and can increase the service life of the coating by increasing shelf stability. Typically, low levels of surfactants are used to accomplish these goals and mixtures of surfactants may be employed to impart one or more of the properties listed above. Surfactants are not generally volatile materials under ambient conditions and remain in the coating during the drying process. However, at the low concentrations typically used, little effect on polymer hardness or coating performance is observed. If too much surfactant is used in the aqueous coating composition, the wet coating could exhibit excessive foaming and poor thickening efficiency with thickeners while the cured coating could have problems with water sensitivity, poor exterior durability and poor block, stain and print resistance. Thus, surfactants are typically used in the lowest amounts necessary to achieve their beneficial properties while avoiding any detrimental effects.

Any anionic or nonionic surfactant, as well as mixtures, may be used in a water-based polymer coating composition of the invention. The surfactant is present in an amount effective to stabilize a coating formed from the composition. Preferably the nonionic surfactant is a polyether nonionic surfactant, more preferably, an alkyl polyglycol ether, an alkyl phenol polyglycol ether or a mixture thereof. Preferred alkyl phenol polyglycol ethers include ethoxylation products of octylphenol, nonylphenol, diisopropyl phenol, triisopropyl phenol or mixtures thereof. Preferred alkyl polyglycol ethers include ethoxylation products of lauryl alcohol, oleyl alcohol, stearyl alcohol or mixtures thereof. Preferred anionic surfactants include alkali metal or ammonium salts of alkyl, aryl or alkylaryl sulfonates, sulfates, phosphates. More preferably, the anionic surfactant is selected from sodium lauryl sulfate, sodium octylphenol glycolether sulfate, sodium dodecylbenzene sulfonate, sodium lauryldiglycol sulfate, ammonium tritertiarybutyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and mixtures thereof. AEROSOL 18 surfactant, a 35% solution of disodium N-octyldecyl sulfosuccinimate in water and AEROSOL OT-75 surfactant, a 75% solution of sodium dioctyl sulfosuccinate in water, both available from Cytec Industries, Inc. are preferred anionic surfactants. Triton GR-7M is also preferred sulfosuccinate surfactant.

The aqueous coating composition of the invention is formulated using 10 to 90 parts, preferably 50 to 70 parts, of a polyfunctional oligomer; 90 to 10 parts, preferably 30 to 50 parts, water; and 0.1 to 10 parts, preferably 0.1 to 5 parts, of a surfactant, without addition of co-solvent. After mixing the polyfunctional oligomer and water, the surfactant is added for dispersion and, if desired a diluted drop of defoamer, such as BYK 028 by BYK Chemie USA, may be used as a flow aid. The formulation may be mixed at room temperature.

A coating formed from an aqueous coating composition of the invention may be self-cured by heating to temperatures at or above 120° C. In a preferred embodiment, an aqueous coating composition of the invention contains a curing agent. As is known in the art, curing agents are sold separately from the coating composition, Accordingly, a curing agent may be added to an aqueous coating composition of the invention prior to coating. The amount of curing agent used is determined by the stoichiometric ratio of epoxy groups of the epoxy urethane (glycidyl carbamate) resin to active amine hydrogens on the amine curing agent. Stoichiometric ratios in the range of 0.5 to 2.0 can be used.

The curing agent serves to crosslink the resultant epoxy urethane coating formed using an aqueous coating composition of the invention. The curing agent may be any curing agent known in the art to cure (or crosslink) epoxy resins. The curing agent may be used in the manner and amount known in the art. The curing agents are generally water compatible (i.e., soluble, dilutable and/or dispersible). Suitable curing agents for use with the dispersions include those typically employed with epoxy resins, such as aliphatic, araliphatic and aromatic amines, polyamides, amidoamines and epoxy-amine adducts. The coating may be cured at ambient or elevated (e.g. about 80° C.) temperatures. Amine curing agents typically allow the coating to cure at ambient temperatures.

Suitable amine curing agents are those which are soluble or at least dispersible in an aqueous coating composition of the invention. Amine curing agents known in the art include, for example, diethylenetriamine, triethylenetetramine, tetraethylene-pentamine, etc. as well as 2,2,4- and/or 2,4,4-trimethylhexamethylenediamine; 1,2- and 1,3-diaminopropane; 2,2-dimethylpropylenediamine; 1,4-diaminobutane; 1,6-hexanediamine; 1,7-diaminoheptane; 1,8-diaminooctane; 1,9-diaminononae; 1,12-diaminododecane; 4-azaheptamethylenediamine; N,N"-bis(3-aminopropyl)butane-1,4-diamine; 1-ethyl-1,3-propanediamine; 2,2(4),4-trimethyl-1,6-hexanediamin; bis(3-aminopropyl)piperazine; N-aminoethylpiperazine; N,N-bis(3-aminopropyl)ethylenediamine; 2,4(6)-toluenediamine; dicyandiamine; melamine formaldehyde; tetraethylenepentamine; 3-diethylaminopropylamine; 3,3"-iminobispropylamine; tetraethylenepentamine; 3-diethylaminopropylamine; and 2,2,4- and 2,4,4-trimethylhexamethylenediamine. Exemplary cycloaliphatic amine curing agents include, but are not limited to, 1,2- and 1,3-diaminocyclohexane; 1,4-diamino-2,5-diethylcyclohexane; 1,4-diamino-3,6-diethylcyclohexane; 1,2-diamino-4-ethylcyclohexane; 1,4-diamino-2,5-diethylcyclo-hexane; 1,2-diamino-4-cyclohexylcyclochexane; isophorone-diamine; norbornanediamine; 4,4'-diaminodicyclohexylmethane; 4,4'-diaminodicyclohexylethane; 4,4'-diaminodicyclohexylpropane; 2,2-bis(4-aminocyclohexyl)propane; 3,3'-dimethyl-4,4'-diaminodicyclohexylmethane; 3-amino- 1-(4-aminocyclohexyl)propane; 1,3- and 1,4-bis(aminomethyl)cyclohexane; and 1-cyclohexyl-3,4-dimino-cyclohexane. As exemplary araliphatic amines, in particular those amines are employed in which the amino groups are present on the aliphatic radical for example m- and p-xylylenediamine or their hydrogenation products as well as diamide diphenylmethane; diamide diphenylsulfonic acid (amine adduct); 4,4"-methylenedianiline; 2,4-bis(p-aminobenzyl) aniline; diethyltoluenediamine; and m-phenylene diamine. The amine curing agents may be used alone or as mixtures.

Suitable amine-epoxide adducts are, for example, reaction products of diamines such as, for example, ethylenediamine, diethylenetriamine, triethylenetetramine, m-xylylenediamine and/or bis(aminomethyl)cyclohexane with terminal epoxides such as, for example, polyglycidyl ethers of polyhydric phenols listed above.

Preferably, amine curing agents used with the aqueous coating compositions of the invention are PACM (bis(para-aminocyclohexyl)methane), Anquamine 419, diethylene triamine (DETA), and 4,4'-methylene dianiline (MDA). Stoichiometry ratios of amine to oxirane of the aqueous coating compositions may be based on amine hydrogen equivalent weight (AHEW) and on weight per epoxide (WPE). A formulation of 1:1 was based on one epoxide reacted with one amine active hydrogen.

The invention also provides a method for making an aqueous coating composition comprising the steps of mixing a polyfunctional oligomer having at least two epoxy urethane functional groups and a hydroxylated polyalkylene oxide chain, a surfactant and water. The method for making an aqueous coating composition may further comprise the step of adding a curing agent to the mixture of the polyfunctional oligomer, the surfactant and water after the dispersion.

The aqueous coating compositions of the invention have an excellent combination of physical properties due to the carbamate and epoxide functionality. The coating composition has excellent cure and high pendulum hardness values as well as good solvent resistance. The aqueous coating composition with epoxy urethane functional resin of the invention shows the improvement in one or more of the following performance parameters, i.e., % nonvolatile solids, flexibility, scratch and mar resistance, and/or chip resistance, in a wide variety of coating compositions and applications, such as primers, basecoats, clearcoats, two-component systems, anti-chip coating compositions, water borne coatings, solvent borne coatings, coatings for flexible substrates, and the like. Furthermore, water-based coating composition with epoxy urethane functional resin of the invention provide etch resistant coating compositions which have an increased % NV (nonvolatile) or decreased VOC (volatile organic content) at a sprayable viscosity.

An aqueous coating composition of the invention would be applicable for use in a wide variety of coating compositions and applications, such as primers, basecoats, clearcoats, two-component systems, anti-chip coating compositions, water borne coatings, solvent borne coatings, coatings for flexible substrates, powder coatings, solventless powder-slurry coatings, solventless liquid coatings, and the like. Furthermore, the aqueous coating composition of the invention may be applied to any substrates, e.g., metal, wood, glass, stone, ceramic materials, concrete, rigid and flexible synthetic resins, textiles, leather and paper. These substrates may first be treated with conventional primers before they are coated.

Any additional agent used in aqueous coatings, for example, fillers, stabilizers, wetting agents, dispersing agents, adhesion promoters, UV absorbers, HALS, etc. may be incorporated into the coating composition of the invention. While the agents are well-known in the prior art and may be used in the same manner, the amount used should avoid adversely affecting the aqueous coating composition or the resultant coating.

Upon formulation, an aqueous coating composition of the invention may then be applied to a variety of surfaces, substrates, or articles, e.g., paper, plastic, steel, aluminum, wood, gypsum board, or galvanized sheeting (either primed or unprimed). The aqueous coating composition may be applied to a substrate, article or surface by any of a number of techniques well-known in the art. These include, for example, spray coating, dip coating, roll coating, curtain coating, and the like. For automotive body panels, spray coating is preferred. As discussed above, an aqueous coating employing a polymer of the invention may be thermally or ambiently cured. As a further aspect, the present invention relates to a shaped or formed article which has been coated with an aqueous coating composition of the invention.

A coating composition according to the invention may comprise a a pigment (organic or inorganic) and/or other additives and fillers known in the art Such additives or fillers include, but are not limited to, leveling, rheology, and flow control agents such as silicones, fluorocarbons, urethanes, or cellulosics; extenders; reactive coalescing aids such as those described in U.S. Pat. No. 5,349,026; flatting agents; pigment wetting and dispersing agents and surfactants; ultraviolet (UV) absorbers; UV light stabilizers; tinting pigments; extenders; defoaming and antifoaming agents; anti-settling, anti-sag and bodying agents; anti-skinning agents; anti-flooding and anti-floating agents; fungicides and mildewcides; corrosion inhibitors; thickening agents; plasticizers; reactive plasticizers; curing agents; or coalescing agents. Specific examples of such additives can be found in Raw Materials Index, published by the National Paint & Coatings Association, 1500 Rhode Island Avenue, NW, Washington, D.C. 20005.

EXAMPLES

The following abbreviations and terms are used in the Examples below:
HDI: hexamethylene diisocyanate
PACM: para amino-cyclohexyl methane
Anquamine 419: curing agent
MEK: Methyl ethyl ketone
ASTM: American Society for Testing and Materials
Materials Glycidol was supplied by Dixie Chemical and stored refrigerated to minimize formation of impurities. An isocyanurate trimer of HDI (hexamethylene diisocyanate) with polyethylene oxide (Bayhydur XP 7165) was used as the polyfunctional isocyanate resin with an isocyanate equivalent weight of 230. K-KAT® XC-6212 was supplied by King Industries. Triton™ GR-7M anionic surfactant was provided by Union Carbide and BYK 028 defoamer was provided by BYK Chemie USA. Amines used as hardeners were purchased from Aldrich and provided by Air Products. These include; bis(para-aminocyclohexyl)methane (PACM) and Anquamine 419, respectively. D.E.R.® 332 (DGEBA) was supplied by The Dow Chemical Company.

Example 1

Synthesis of the Epoxy Urethane Resin

A 1000 ml four neck round bottom flask with condenser, nitrogen inlet and Model 210 J-KEM temperature controller, mechanical stirrer, with heating mantle were used for synthesis. The reaction vessel was charged with 225.21 grams glycidol and 700 grams of Bayhydur XP 7165 polyfunctional isocyanate resin and 0.112 grams K-KAT® XC-6212 (0.0025 weight percent). The temperature was held at 60° C. and the reaction was monitored and controlled within +/− two degrees Celsius. Infrared analysis was performed to determine reaction completion by monitoring the disappearance of the isocyanate peak at 2270 cm$^{-1}$. Epoxy equivalent weights were determined by titration with HBr (ASTM D1652). The theoretical epoxide equivalent weight of the product was 304, which compares with 303 grams/equivalent determined by titration.

Infrared (FTIR) measurements were performed using a Nicolet Magna-850 FTIR spectrometer. Sample aliquots were taken and coated directly on a potassium bromide salt plate. Omnic FTIR software for Nicolet was used to perform transmission with a final format of absorbance. Spectra acquisitions were based on 64 scans, resolution 4 and a data spacing of 1.98 cm$^{-1}$. The main compartment was used and set for auto gain to monitor a spectral range of 4000 cm$^{-1}$ to 400 cm$^{-1}$. Different intervals of the reaction were sampled to monitor disappearance of the isocyanate peak. GRAMS 32 v5 FTIR software was employed for spectral calculations.

Example 2

Aqueous Coating Compositions of the Invention

Aqueous coating compositions of the invention were formulated using the epoxy urethane resin of Example 1, an amine curing agent and water without addition of organic co-solvent. Coatings were formulated using 70% epoxy urethane resin and 30% water without addition of co-solvent. After mixing the resin and water, 1-drop Triton GR-7M surfactant was added for dispersion and diluting ⅙ of a drop of BYK 028 was used as a flow aid. Formulations were mixed with a glass stir rod, by hand, at room temperature. After the resin was dispersed in water, the amine curing agent, PACM or Anquamine 419, was added. Table 1 illustrates the formulation with actual amounts used. Coatings of from the aqueous coating compositions of the invention were prepared and tested as described below.

TABLE 1

Aqueous Coating Composition Formulation

| Formulation | Water (g) | Resin (g) | PACM (g) | Anquamine 419 (g) | Solids (%) |
|---|---|---|---|---|---|
| 1 | 3.752 | 8.474 | 1.450 | — | 69.3 |
| 2 | 4.50 | 3.752 | — | 9.710 | 69.7 |

Film Preparation: The aqueous coating formulations were applied onto iron phosphated 22 gauge steel test panels purchased from Q-panel. Coating application was made using a drawdown bar for a final dry film thickness of approximately 64 microns for the PACM addition and approximately 71 microns for the Anquamine 419 addition. The coated panels were then air cured or placed in an oven at 80° C. for 60 minutes for crosslinking.

Hardness Measurements: Hardness of films was evaluated 24 hours after the films cured in an 80° C. oven for 60 minutes and also for the air cured coatings. The films were tested for König pendulum hardness (ASTM D4366, with the values reported in seconds (sec)).

Reverse Impact Testing: ASTM D2794 was used as a standard test method for the resistance of organic coatings to the effects of rapid deformation via reverse impact. Coatings were tested one week after cure using a Gardener impact tester (ASTM D 2794). The maximum drop height was 43 inches with a drop weight of 4 pounds. All measurements were performed in triplicate. Crazing or loss of adhesion was noted and inch pounds were determined at film finish failure. Samples that did not fail were noted >172 in-lbs.

MEK Double Rubs: Methyl ethyl ketone (MEK) double rubs were used to assess the development of cure. The coating was applied to the steel test panel using a casting bar. For the ambient cure system, coated panels were placed in a dust free chamber to cure at room temperature. Panels were removed to determine cure by solvent resistance at the end of 2, 3 and 3.45 hours when PACM was used as the hardener. For the coating formulations Anquamine 419 was less reactive than PACM, measured by solvent resistance were place in the dust free chamber for 24 hours then analyzed for solvent resistance. A 26-ounce hammer with 5-layers of cheesecloth wrapped around the hammerhead was soaked in MEK. After 100 double rubs the hammer was rewet with MEK. The number of double rubs to reach the substrate of the coating was reported. A fully cured coating was based on 400 double rubs without penetrating the coating to the substrate. The number of double rubs to reach the substrate coating was reported.

Gloss Measurements: A Gardco® Novo-Gloss™ GL-NG1001S statistical gloss meter was used to determine gloss. Gloss measurements were preformed using three different geometries 20°, 60° and 85°. Geometry was optimized for a specific gloss range. In order to control the performance and linearity of the gloss meter a checking standard was used. The standard tile is a traceable institute standard. In order to obtain gloss differences three measurement geometries were taken.

Properties of epoxy urethane resin:PACM: Coatings: Table 2 shows the physical property results for the resins crosslinked using the two different amines at 80° C. for 1 hour. The coatings had excellent cure and high pendulum hardness values. PACM yields slightly lower impact resistance and is a generally harder coating. A key difference is the equivalent weight and structure of the amine used.

TABLE 2

Cure development of oven cured coatings, 80° C. for 1-hour.

| Epoxy urethane resin: | Dry film thickness (microns) | Konig Pendulum Hardness (Seconds) | Impact (Inch-pounds) | MEK Double Rubs (Substrate) |
|---|---|---|---|---|
| 1 PACM | 64 | 147 | 168 | >1000 |
| 2 Anquamine 419 | 71 | 94 | >172 | >1000 |

Gloss readings of the 80° C. 1 hour oven cured coatings are shown in Table 3. The different gloss readings of these two samples are more clearly shown in the 20° readings, followed by the 60° readings. Gloss readings were higher for the epoxy urethane resin:PACM than for the epoxy urethane resin:Anquamine 419 for all three geometries used.

TABLE 3

Gloss of oven cured coatings, 80° C. for 1-hour.

| Gloss (degrees) | 2 Anquamine 419 | 1 PACM |
|---|---|---|
| 20 | 22.14 | 45.60 |
| 60 | 63.03 | 69.71 |
| 85 | 80.49 | 81.05 |

Example 3

Cure Development Under Ambient Conditions

Coatings were formulated as in Example 2, and cure development under ambient conditions was evaluated and the results are listed in Tables 4 and 5. Cure develops very rapidly, especially for the PACM-cured coating where full cure is achieved in less than four hours. Both coatings also had good hardness and flexibility after reaching complete cure.

TABLE 4

Cure development of Aqueous Coating Composition 1: PACM Air-cured Coating.

| Epoxy urethane resin | Dry film thickness (microns) | Hours to Cure before Testing | MEK Double Rubs (substrate) | Konig Pendulum Hardness (seconds) | Impact (Inch-pounds) |
|---|---|---|---|---|---|
| 1 PACM | 68 | 2 | — | 159 | — |
| — | — | 3 | 143 | 160 | — |
| — | — | 3.45 | >1000 | 143 | 164 |

TABLE 5

Cure Development of Aqueous Coating Composition 1: Anquamine 419 Air-cured Coating.

| Epoxy urethane resin | Dry film thickness (microns) | Hours to Cure before Testing | MEK Double Rubs (substrate) | Konig Pendulum Hardness (seconds) | Impact (Inch-pounds) |
|---|---|---|---|---|---|
| 2. Anquamine | 68 | 2 | 111 | — | — |
| — | — | 3 | 113 | — | — |
| — | — | 24 | >1000 | 106 | >172 |

The epoxy urethane resin:PACM had a slightly lower impact resistance than the epoxy urethane resin:Anquamine 419 and was generally a harder coating, possibly due to the equivalent weight and structure (cycloaliphatic amine) of the amine used. For ambient curing, the epoxy urethane resin: PACM fully cured within 3.5 hours and the epoxy urethane resin:Anquamine 419 cured over night. Both systems fully cured at 80° C. after a 1-hour cure. The epoxy urethane resin:PACM demonstrated a higher gloss than the epoxy urethane resin:Anquamine 419 for 20°, 60° and 85° geometries.

Example 4

Salt Spray (ASTM B117) Testing of the Epoxy Urethane Resin with Compared to D.E.R. 332

For salt spray testing, an aqueous coating composition was prepared as in Example 2 and a control coating was prepared using D.E.R. 332 cured with PACM. Formulations were prepared using stoichiometric amounts of resin and hardener. Coatings were drawn down with a casting bar for a dry film thickness of approximately 75 microns. Coatings were cured at 80° C. for one hour. Once cured the panels were scribed to obtain a cross cut. Corrosion performance was performed according to ASTM B117. This is a continuous salt fog at 35° C. The electrolyte solution is 49.97 grams sodium chloride per 1 liter de-ionized water. The results are shown in FIG. 1. Corrosion of the test panels can be observed after being subjected to 450 hours in the salt spray chamber. The D.E.R. 332:PACM test panel had the most corrosion at the scribe (C) and the epoxy urethane resin:PACM began to delaminate (D). The control coating (D.E.R. 332:PACM) out performed the epoxy urethane resin:PACM.

The invention claimed is:

1. An aqueous coating composition comprising:
    (a) a polyfunctional oligomer having at least two epoxy urethane functional groups and a polyalkylene oxide chain;
    (b) a surfactant; and
    (c) water.

2. An aqueous coating composition comprising:
    (a) 10 to 90 parts of a polyfunctional oligomer having at least two epoxy urethane functional groups and a polyalkylene oxide chain;
    (b) 0.1 to 10 parts of a surfactant; and
    (c) 90 to 10 parts water.

3. An aqueous coating composition of claim 1 or claim 2, further comprising a curing agent.

4. An aqueous coating composition of claim 3, wherein the polyfunctional oligomer comprising a polyfunctional resin derived from an isocyanate or a biuret compound.

5. An aqueous coating composition of claim 4, wherein the polyfunctional resin is selected from the group consisting of toluene diisocyanate, toluene diisocyanate biuret, diphenylmethane diisocyanate, diphenylmethane diisocyanate biuret, hexamethylene diisocyanate, hexamethylene diisocyanate biuret, naphthalene diisocyanate, naphthalene diisocyanate biuret, hydrogenated diphenylmethane diisocyanate, hydrogenated diphenylmethane diisocyanate biuret, isophorone diisocyanate and isophorone diisocyanate biuret; and the hydroxylated polyalkylene oxide chain is selected from the group consisting of an ethylene oxide chain, a propylene oxide chain, and an ethylene propylene oxide chain.

6. An aqueous coating composition of claim 4, wherein the polyfunctional resin is hexamethylene diisocyanate or hexamethylene diisocyanate biuret.

7. An aqueous coating composition of claim 3, wherein the curing agent is amine curing agent.

8. An aqueous coating composition of claim 7, wherein the amine curing agent is selected from the group consisting of bis(para-aminocyclohexyl)methane, diethylene triamine, and 4,4'-methylene dianiline.

9. A substrate, article or surface coated with an aqueous coating composition claim 1.

10. A method for making an aqueous coating composition comprising the step of mixing a polyfunctional oligomer having at least two epoxy urethane functional groups and a hydroxylated polyalkylene oxide chain, a surfactant and water.

11. A method for making an aqueous coating composition of claim 10 comprising the step of mixing
    (a) 10 to 90 parts of a polyfunctional oligomer having at least two epoxy urethane functional groups and a polyalkylene oxide chain;
    (b) 0.1 to 10 parts of a surfactant; and
    (c) 90 to 10 parts water.

12. A method for making an aqueous coating composition of claim 10 or 11, further comprising the step of adding a curing agent to the mixture of the polyfunctional oligomer, the surfactant and water after the dispersion.

13. The method for making an aqueous coating composition of claim 12, wherein the curing agent is amine curing agent.

14. The method for making an aqueous coating composition of claim 13, wherein the amine curing agent is selected from the group consisting of bis(para-aminocyclohexyl) methane, diethylene triamine, and 4,4'-methylene dianiline.

15. A method for making an aqueous coating composition of claim 10 or 11, further comprising, before the mixing step, the step of: reacting a hydroxylated polyalkylene oxide modified polyfunctional resin having at least two isocyanates with glycidol to prepare the polyfunctional oligomer.

16. A method for making an aqueous coating composition of claim 15, wherein the polyfunctional is resin derived from an isocyanate compound or a biuret compound.

17. A method for making an aqueous coating composition of claim 16, wherein the polyfunctional resin is selected from the group consisting of toluene diisocyanate, toluene diisocyanate biuret, diphenylmethane diisocyanate, diphenylmethane diisocyanate biuret, hexamethylene diisocyanate, hexamethylene diisocyanate biuret, naphthalene diisocyanate, naphthalene diisocyanate biuret, hydrogenated diphenylmethane diisocyanate, hydrogenated diphenylmethane diisocyanate biuret, isophorone diisocyanate and isophorone diisocyanate biuret; and the hydroxylated polyalkylene oxide chain is selected from the group consisting of an ethylene oxide chain, a propylene oxide chain, and an ethylene propylene oxide chain.

18. The method for making an aqueous coating composition of claim 17, wherein the polyfunctional resin is hexamethylene diisocyanate or hexamethylene diisocyanate biuret.

19. A water-dispersible epoxy urethane resin of the Formula (I) or Formula (II):

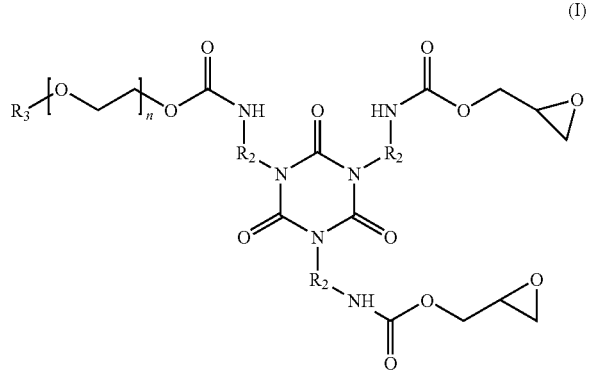

(I)

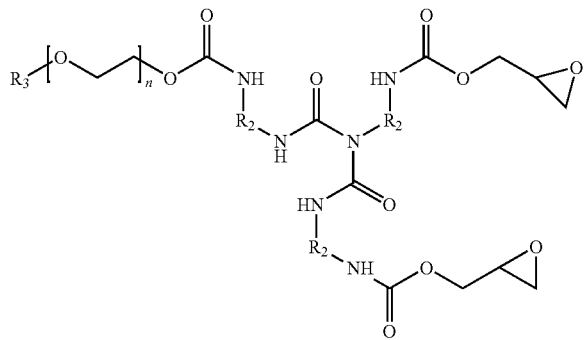

(II)

wherein: n ranges from 1 to 50; $R_2$ is independently an optionally substituted, divalent $C_1$-$C_{15}$ alkyl, optionally substituted divalent $C_3$-$C_{15}$ cycloalkyl, or a group selected from

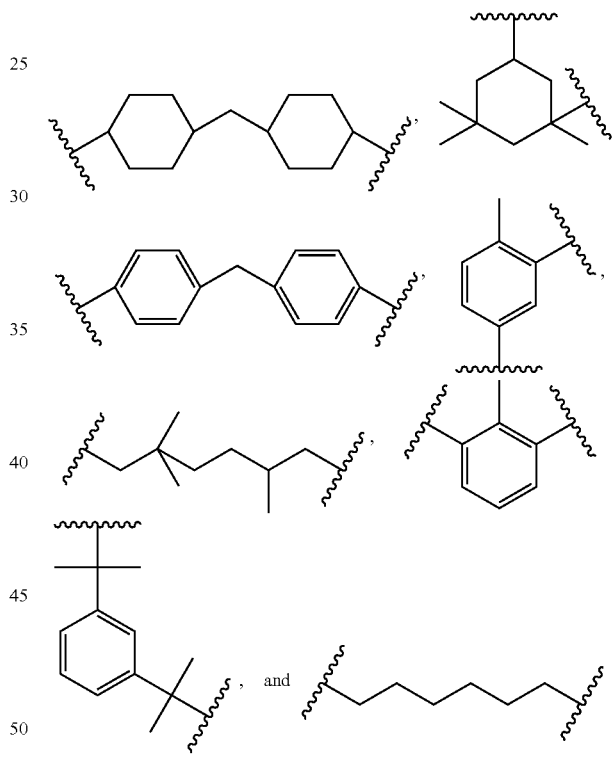

and $R_3$ is independently an optionally substituted $C_1$-$C_{15}$ alkyl or an optionally substituted divalent $C_3$-$C_{10}$ cycloalkyl.

20. The water-dispersible epoxy urethane compound of claim 19, wherein $R_2$ is —$(CH_2)_6$—, and $R_3$ is a $C_1$-$C_{10}$ alkyl.

* * * * *